INVENTOR
A. B. BLAYNEY

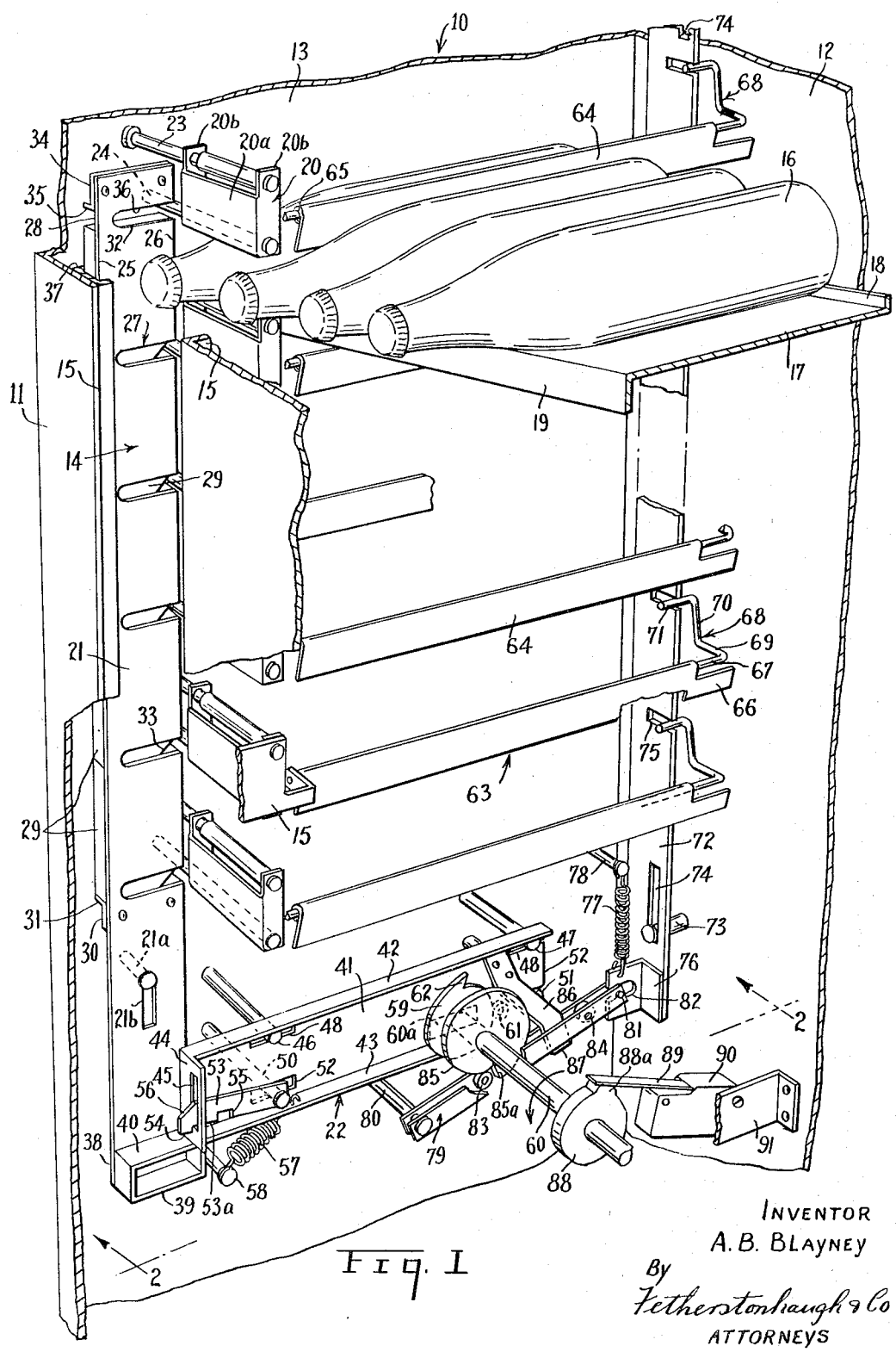

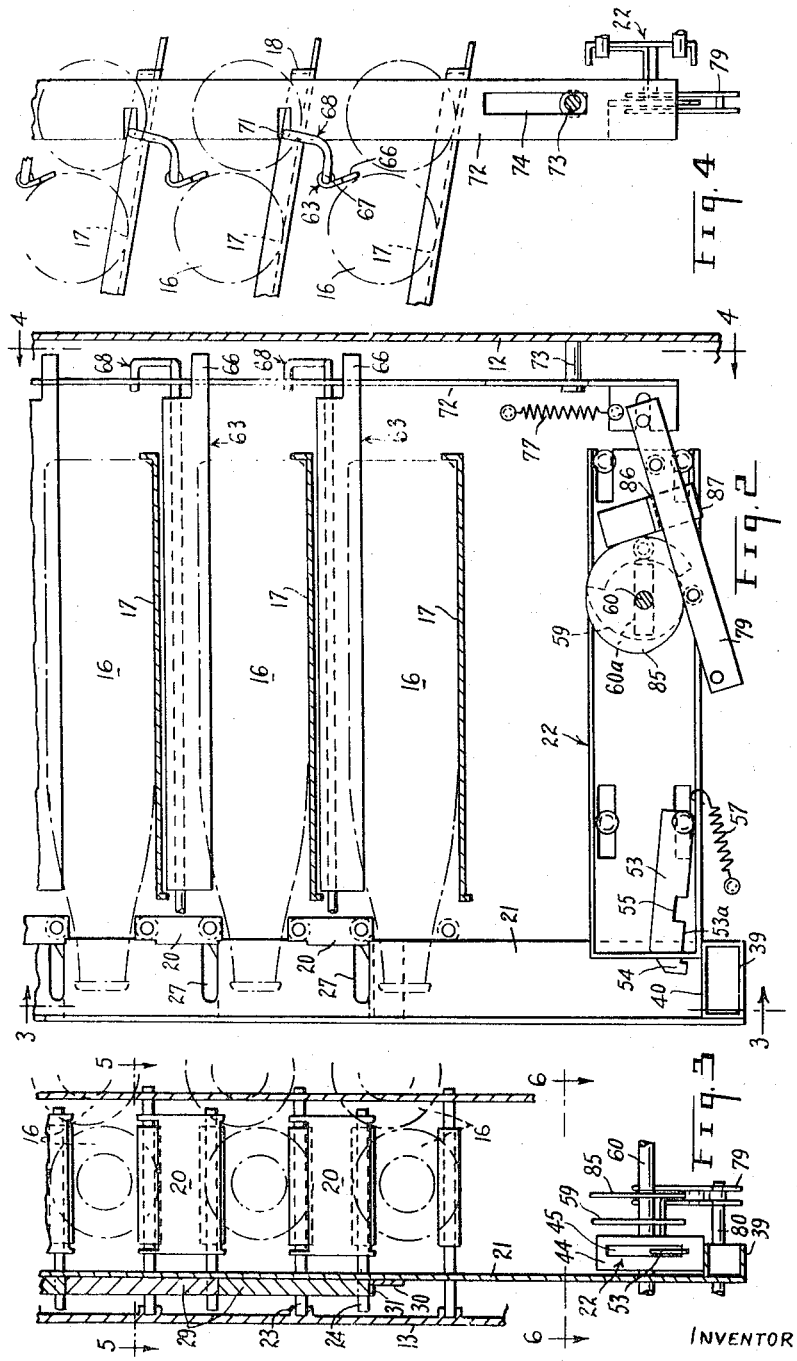

Fetherstonhaugh & Co.
ATTORNEYS

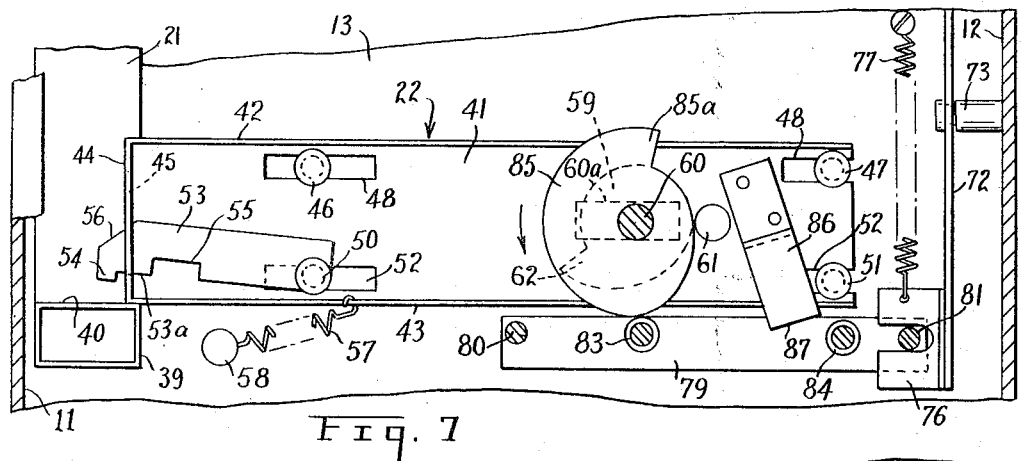
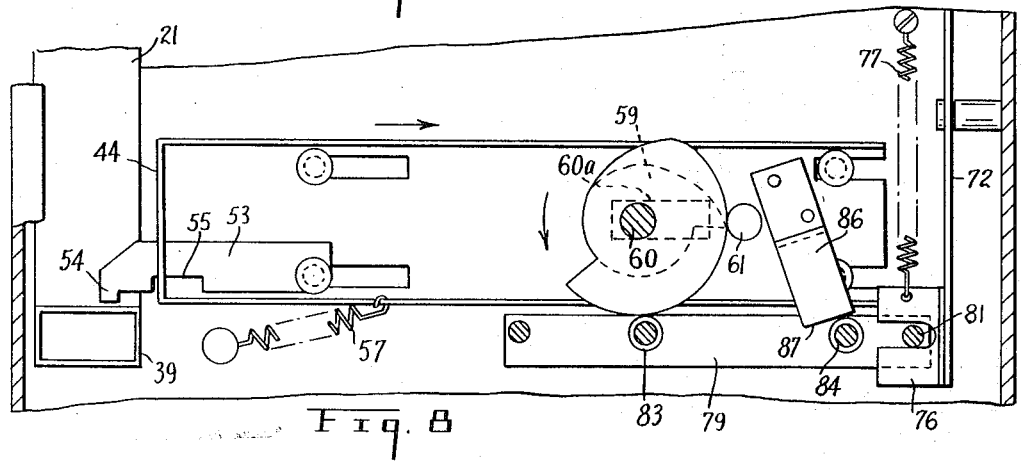
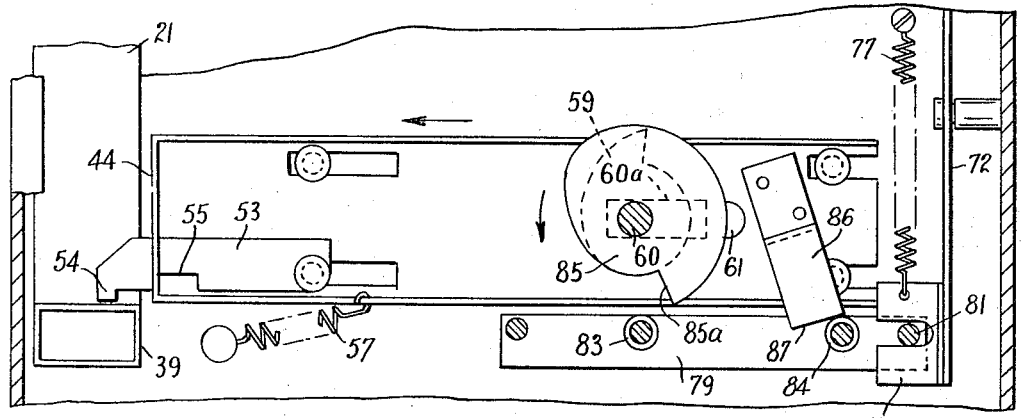

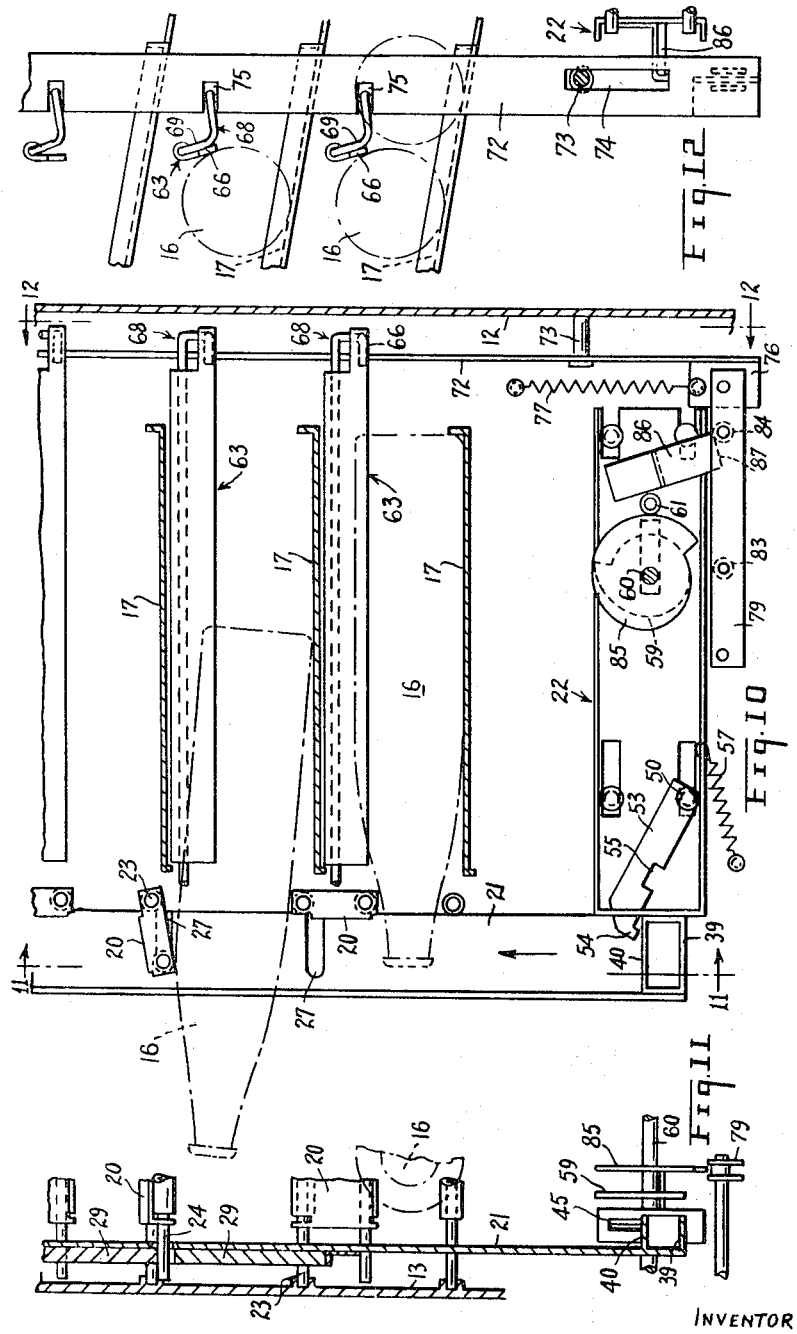

United States Patent Office 3,305,129
Patented Feb. 21, 1967

3,305,129
RELEASE MECHANISM FOR SLOPE SHELF VENDER, INCLUDING A LOCK-OUT ASSEMBLY
Allan B. Blayney, Deseronto, Ontario, Canada, assignor to Ideal Venders (Division of Eddy Match Company, Limited), Montreal, Quebec, Canada
Filed May 10, 1965, Ser. No. 454,366
Claims priority, application Canada, Mar. 30, 1965, 926,950
10 Claims. (Cl. 221—125)

This invention relates to an apparatus for dispensing articles and more particularly to a dispensing mechanism, associated with a storage unit, for releasing a single article at a time while denying access to remaining articles in the unit. An example of such an apparatus is a coin-operated bottle vending machine.

Automatic units to dispense individual articles have become prevalent in recent years. In such units a number of articles of similar size and shape are stacked in a storage unit and fed to an outlet by gravity. Canned and bottled goods are particularly adaptable to such devices since they can be laid on their sides in a row on an inclined shelf and roll downwardly to an outlet feeder. The outlet feeder mechanism usually used in these dispensers is of the "paddle-wheel" type which consists of a plurality of blades radially positioned as fins on a horizontal shaft, the shaft being rotatable, on coin-actuation of a control device, through part of one revolution to release a single bottle, after which it locks. When the single bottle has been moved by the outlet feeder into an accessible position or dumped into a receiving tray, it is removed by the person who has actuated the unit.

The main disadvantage of the above mentioned type of dispenser is that the force required to release each article is applied wholly through the outlet feeder, whether provided by gravity or by motor means. As a result the dispensing of each article from the apparatus is effected with an abrupt movement which causes wear and tear on the mechanism over a period of time and consequently makes necessary a more rugged and costly construction or higher maintenance costs. Also the abrupt movement of the outlet feeder is always startling and disconcerting to the operator no matter what steps are taken to muffle the movement since the operator has no control over the movement itself and hence cannot predict its exact timing.

This and other disadvantages of the above and similar devices are overcome by the present invention which separates the mechanical operation of the machine from the step of actually dispensing the individual article and allots to the operator the task of delivery. In other words, in the present device the self-motivating portion of the apparatus merely places the dispensing device in a state of readiness whereby the operator may withdraw a single article resting within the storage unit. Moreover, the operator's action is facilitated by disassociating, from the portion of the dispensing device which must be moved by the operator to withdraw an article, the means for temporarily restraining further articles from moving into a withdrawal position. Thus the invention provides for a smooth, easy withdrawal of a single article from the apparatus by an operator and under his control.

The invention in its broadest aspect relates to a storage and dispensing apparatus and consists of a mechanism for releasing individual articles which comprises at least one gate adapted to pivot freely about an axis from a closed position of rest to an open position, a locking bar adapted to slide longitudinally in an axis parallel to the plane of rest of the gate and normal to but spaced from the pivotal axis of the gate, a pin carried by the gate parallel to its pivotal axis and spaced from that axis, a slot in the bar positioned normal to the plane of rest of the gate and adapted to receive the pin on pivotal movement of the gate from its position of rest whereby the bar slides longitudinally on such movement, and means operable to release the bar for such slidable movement and to lock the bar on its return to its original position when the gate is closed.

In a preferred embodiment the released mechanism is integral with a storage unit having a number of inclined shelves which hold a stock of the articles and feed them singly by gravity to a position aligned with the gate so that the article may be grasped by an operator of the apparatus and withdrawn from the storage unit, a gate being associated with each shelf and the locking bar being elongated to accommodate a row of slots with a slot juxtapositioned with respect to each gate. Preferably the locking bar carries a shoulder and the means operable to release and to lock the bar comprises a bolt resting against the shoulder of the bar in its position of rest and retractable laterally away from the bar, cam means rotatable to move the bolt laterally, means urging the bolt towards the shoulder, and a latch operable to engage the bolt when retracted while being disengaged by the locking bar when raised whereby the bolt moves laterally against the shoulder of the bar and over it to lock the bar when the bar is returned to its original position of rest on closing of the gate opened by the operator. Furthermore the preferred embodiment includes means to restrain a further article from moving into alignment with the particular gate when the operator withdraws the article previously aligned with the gate and before the gate is closed again. In a particular construction the restraining means comprises a slidable bar positioned parallel to the locking bar, a rigid flap freely swingable in the path of the article adjacent the one in line with the gate and being withdrawn by the operator, the bar being actuated by the cam means associated with the bolt to lock the flap against movement of said adjacent article when the means operable to release the locking bar is actuated.

An example embodiment of the invention will now be described with reference to the accompanying drawings in which:

FIGURE 1 is a partial view in perspective of a storage unit, broken away to reveal the dispensing mechanism of the invention;

FIGURE 2 is a cross-sectional side view, in elevation, of the dispensing mechanism taken along the line 2—2 of FIGURE 1;

FIGURE 3 is a cross-sectional view in elevation taken along the line 3—3 of FIGURE 2; the mechanism being in its rest position;

FIGURE 4 is a view in elevation taken along the line 4—4 of FIGURE 2;

FIGURE 7 is a view in elevation of the locking portion of the mechanism shown in FIGURES 1 and 2 in its first stage of operation;

FIGURE 8 is a view similar to FIGURE 7 showing the second stage of operation of the locking portion of the mechanism;

FIGURE 9 is a view again similar to FIGURE 7 showing the third stage of operation of the locking portion of the mechanism;

FIGURE 10 is a view similar to FIGURE 2 but showing the fourth or final stage in the operation of the device wherein an article is partially withdrawn from the storage unit;

FIGURE 11 is a view in cross-section taken along the line 11—11 of FIGURE 10;

FIGURE 12 is a view taken along the line 12—12 of FIGURE 10;

Figure 5:
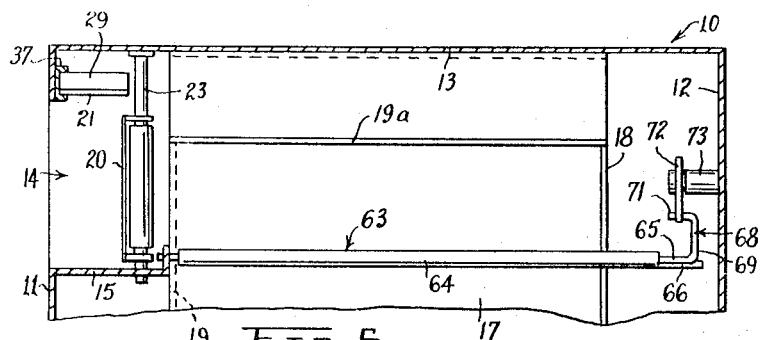
FIGURE 5 is a plan view in cross-section taken along the line 5—5 of FIGURE 3.
Figure 6:
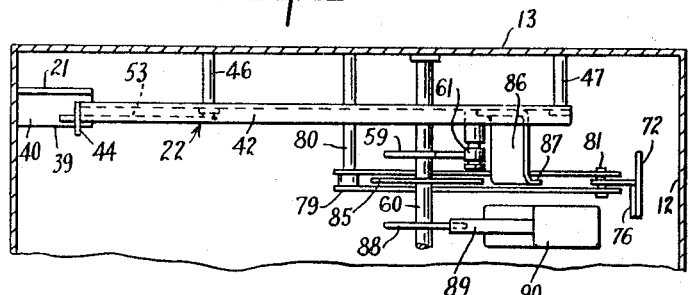
FIGURE 6 is a plan view in cross-section taken along the line 6—6 of FIGURE 3.

Referring first to FIGURE 1 of the drawings, the embodiment consists of a housing 10 having a front wall 11, a rear wall 12, a side wall 13, together with another side wall and a base and top not shown. Front wall 11 has a vertical opening or slot 14 adjacent side wall 13. Slot 14 is bounded at its vertical edge remote from side wall 13 by a series of inturned L-shaped flanges 15 and is slightly wider than the greatest diameter of bottles 16 to be dispensed from the storage unit. The interior of housing 10 carries a plurality of chutes or shelves 17 positioned one above the other and fixed at one end to side wall 13. Shelves 17 are inclined downwardly towards side wall 13 to provide a sloping surface. Shelf 17 carries an upwardly extending flange 18 along its edge adjacent rear wall 12 and a downwardly turned flange 19 along its edge parallel to front wall 11. Both flanges 18 and 19 are spaced from walls 12 and 11 respectively, as shown more clearly in FIGURE 5 of the drawings. An abutment flange 19a is also carried by shelf 17 parallel to and adjacent side wall 13.

The release mechanism consists of a plurality of gates 20 disposed within housing 10 one above the other in alignment with slot 14, each gate being aligned with one of shelves 17. An elongated rectilinear locking bar 21 is disposed vertically within the housing to one side of slot 14, and a horizontally slideable bolt 22 engages with locking bar 21 adjacent its lower end.

Each gate 20 consists of a plate 20a carrying at its lateral edges a pair of flanges 20b. Gate 20 is suspended pivotally from a shaft 23 which is fixed at one end in side wall 13 of housing 10, passes through flanges 20b, and is fixed at its other end in flange 15. Shafts 23 are spaced one from another a distance fractionally greater than the largest transverse diameter of the bottles to be vended. Gate 20 hangs downwardly from shaft 23 when in a position of rest but can be swung upwardly and forwardly towards front wall 11 of housing 10. Rearward swinging of gate 20 is prevented by swingable detent means (not shown) on flanges 20b and shaft 23. The bottom portion of gate 20 carries a horizontal pin 24 passing through and fixed to flanges 20b and projecting laterally towards side wall 13. Pin 24 is thus parallel to shaft 23 and spaced from it. One of gates 20 is associated with each shelf 17 and is positioned in front of flange 19 such that shaft 23 is above the plane of its associated shelf while pin 24 is below that plane. As shown in FIGURES 2 and 10, the space between shaft 23 of one gate 20 and pin 24 of the gate next above it should be just sufficient to accommodate the neck of bottle 16 but not wide enough to allow the body of the bottle to pass through the space.

Figures 13, 14:
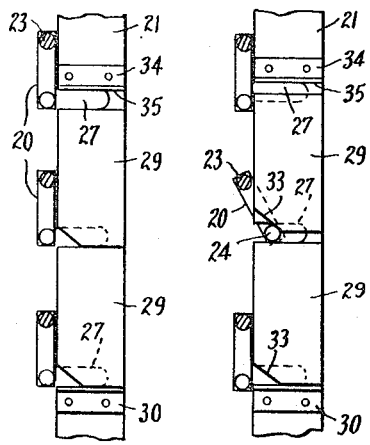
FIGURE 13 is a view in elevation of a portion of the vertical locking bar (viewed from the left in FIGURE 1) showing displacement blocks located thereon.
FIGURE 14 is a view similar to FIGURE 13 but showing the displacement of a block on opening of a gate.

Locking bar 21 comprises a flat elongated strip positioned vertically on that side of slot 14 adjacent side wall 13 of housing 10. Bar 21 is positioned in a plane normal to the plane of gates 20 in their position of rest, forward edge 25 of the bar abutting front wall 11 of housing 10 and rearward edge 26 being positioned adjacent shafts 23 and offset laterally from gate 20. Suitable pins 21a fixed to side wall 13 and movable in slots 21b, in bar 21 adjacent each end of the bar allow the bar limited vertical movement. A series of horizontal slots 27 are located in bar 21, opening at rearward edge 26 of the bar and each being of a width to accommodate pin 24. Side 28 of bar 21 facing side wall 13 of housing 10 carries a series of displacement blocks 29, one block in each space between succeeding slots 27. Blocks 29 rest one upon the other with the lowest block resting on a terminal shoulder or flange 30 fixed to bar 21, flange 30 having a bearing surface 31 parallel with lower edge 32 of lowermost slot 27. The vertical length of each block 29 is equal to the distance between the lower edge 32 of one slot 27 and the lower edge of the next higher slot. Each block 29 has on its lower edge a bevel 33 which slopes upwardly and rearwardly to a height equal to the vertical width of slot 27, as shown in FIGURE 13. An upper terminal shoulder or flange 34, fixed to bar 21 and having a bearing surface 35 parallel with upper edge 36 of uppermost slot 27, acts as an upper stop for blocks 29. A vertical channel 37 on front face 11 of housing 10 restrains blocks 29, as well as locking bar 21, from lateral movement. Lower end 38 of bar 21 carries a shoulder 39 perpendicular to the bar and having a horizontal plane or abutting surface 40.

The means acting against shoulder 39 to restrain vertical movement of bar 21 consists of bolt 22 which is a channel structure having a horizontally elongated vertical web 41, upper and lower horizontal flanges 42 and 43, and a vertical end flange 44 which includes a vertical slot 45. Bolt 22 is freely supported by an upper pair of horizontal bearing shafts 46 and 47 fixed to side wall 13 of housing 10 and projecting through a pair of horizontal slots 48 in web 41, and a lower pair of horizontal bearing shafts 50 and 51 fixed at one end to side wall 13 of housing 10 projecting through a pair of slots 52 in web 41. A latch 53 is pivoted at one end on lower forward shaft 50 and projects forwardly through slot 45 of flange 44. Latch 53 carries a downwardly protruding head 54 at its free forward end and spaced rearwardly from head 54 is a rectangular notch or depression 55 in the lower edge 53a of the latch. The upper forward edge of latch 53 is bevelled at 56. A tension spring 57 connected at one end to lower flange 43 and at the other end to a pin 58 fixed to end wall 13 urges bolt 22 forwardly over shoulder 39 of locking bar 21.

Bolt 22 is moved horizontally by a cam 59 fixed on a drive shaft 60 which is rotated counterclockwise by a suitable coin-actuated electric motor not shown. Shaft 60 passes through a horizontal slot 60a in web 41 of bolt 22 and its end is journalled in side wall 13. Cam 59 bears against a cam follower 61 fixed to web 41 of bolt 22. The surface of generation of cam 59 is circular through approximately 300° and then curves outwardly from the centre of rotation for the remaining 60°, dropping back radially on reaching the full circle to form a shoulder 62 having a radial depth slightly greater than the distance along the lower edge 53a of latch 53 from head 54 to notch 55.

When a bottle 16 has been withdrawn through one of gates 20 by an operator after actuation of the release mechanism to move bolt 22 off shoulder 40 of locking bar 21 it is important to prevent a further bottle from rolling downward along inclined shelf 17 to fill the void while the mechanism is still operable, that is, before gate 21 has returned to a position of rest and locking bar 21 has been relocked by forward movement of bolt 22. To accomplish this the device provides a restraining mechanism having a plurality of stop means 63, one stop means being associated with each shelf 17. Each stop means 63 has a horizontally elongated plate 64 with its upper edge curved in upon itself to form a bearing 65. Plate 64 also carries a tab 66 extending rearwardly from its lower edge. A horizontally disposed shaft 67 passes through bearing 65 and is pivotally mounted at its forward end in vertical flange 15 which is slotted horizontally between successive shafts 67 to allow the passage of the necks of bottles 16 as they move downward on shelves 17 into alignment with gates 20. The rearward end of shaft 67 is elbowed to provide a lever arm 68 which is configured to provide a horizontal portion 69, a vertical intermediate portion 70 in the plane of the horizontal portion, and a horizontal end portion 71 parallel to shaft 67.

A rectilinear shift bar 72 is positioned vertically adjacent rear wall 12 and side wall 13 of housing 10. Bar 72 is mounted slidably on pins 73 which cooperate with spaced vertical slots 74 in the bar. A plurality of horizontal slots 75 in bar 72 accommodate end portions 71 of arms 68. The bottom end of bar 72 carries a bracket 76 to which is attached one end of a tension spring 77. The other end of tension spring 77 is attached above bracket 76 to a pin 78 in side wall 13 and in this manner bar 72 is urged upwardly into the position shown in FIGURE 1 of the drawings.

Vertical movement of bar 72 is effected by a connecting arm 79 which is pivoted at one end on a pin 80 fixed to side wall 13 below bolt 22 and carries at the other end a pin 81 slidable in a horizontal slot 82 in a bracket 76. Arm 79 also carries intermediate its ends a cam follower 83 and a stop pin 84. Immediately above arm 79 cam 85 is carried by drive shaft 60. The surface of generation of cam 85 is such that in moving through one revolution the cam immediately depresses bar 79 against the action of spring 77 and thereafter holds it depressed until completion of the revolution whereupon the bar is abruptly released by dropping over a shoulder 85a. Web 41 of bolt 22 carries a Z-flange 86 which projects outwardly and downwardly so that its end portion 87 is located adjacent stop pin 84 and will be positioned immediately above pin 84 when arm 79 is depressed and bolt 22 is moved rearwardly.

Drive shaft 60 also carries a cam 88 having a circular surface of generation and an isolated shoulder 88a. Cam 88 acts against an arm 89 of a normally closed switch 90 which is mounted on rear wall 12 of housing 10 by a bracket 91. Switch 90 is connected with the motor driving shaft 60 and is adapted to de-activate the motor which, however, can be independently re-activated.

The operation of the device may be divided into two steps; the first step unlocking the apparatus and placing it in a "at ready" position under motive power supplied by the unit itself, the second step "vending" an article and returning the apparatus to a locked position under motive power supplied by the operator.

The apparatus is shown in the "at rest" position in FIGURES 1 and 2 of the drawings. In this position locking bar 21 is in its lowermost position with each slot 27 located horizontally opposite its corresponding pin 24 of gate 20, while bolt 22 urged forwardly by spring 57 overlaps surface 40 of shoulder 39. Latch 53 projects through slot 45 of flange 44 with that part of its lower edge 53a between head 54 and notch 55 resting on the lower end of the slot. End portion 87 of Z-flange 86 lays adjacent arm 79 forward of stop 84. Bar 72 is in its upper resting position held in that position by spring 77. Cams 59 and 85 are oriented on shaft 60 to achieve these positions of bolt 22 and arm 79 respectively. Cam 88 is oriented on shaft 60 in a manner such that its shoulder 88a is acting upon arm 89 of switch 90 to keep the switch open in the at rest position.

It should be noted that in the at rest position each gate 20 hangs freely from its associated shaft 23 so that pin 24 is disposed below shaft 23 in the same vertical plane. Also, each plate portion 64 of stop bar 63 hangs freely from its associated shaft 67 so that a bottle 16 on a shelf 17 may roll downwardly to the end of the shelf and into alignment with gate 20, plate portion 64 being swung upwardly by the passing bottle then dropping back into its original hanging position abutting the next bottle in the row.

To allow a bottle 16 to be withdrawn from the unit an operator places a coin into an appropriate slot in housing 10 which actuates the electric motor within the housing. The motor rotates drive shaft 60, and cams 59, 85 and 88, counter-clockwise. From its position of rest shown in FIGURE 2 of the drawings, three phases of one complete revolution of shaft 60 are shown in FIGURES 7, 8 and 9. It will be seen that, in the first quarter turn of shaft 60 as shown in FIGURE 7, cam 85 acting on follower 83 will depress arm 79, lower bar 72 against the action of spring 77 and bring stop 84 to a position below and to the right of end portion 87 of flange 86. During the next half turn of shaft 60 as shown in FIGURE 8, cam 85 maintains arm 79 in its depressed position while cam 59 moves bolt 22 rearwardly (to the right in the drawing) and causes flange 44 to clear shoulder 39 of locking bar 21. Also, flange 44 moves into the region of notch 55 and causes latch 53 to drop into a horizontal position whereby head 54 abuts surface 40 of shoulder 39. The rearward movement of bolt 22 positions end portion 87 of flange 86 immediately above stop 84 on arm 79. The final counterclockwise quarter turn of shaft 60 as shown in FIGURE 9, allows follower 61 to clear shoulder 62 on cam 59 which causes bolt 22 to move forward again (to the left in the drawing) under the action of spring 57. However, this forward movement of bolt 22 is arrested by the impingement of flange 44 against the front wall of notch 55 so that flange 44 remains clear of shoulder 39 on locking bar 21. The same final quarter turn of shaft 60 allows follower 83 to clear shoulder 85a of cam 85 which in turn allows arm 79 to move upward under the action of spring 77 on bar 72. However, the upward movement of arm 79 is immediately arrested by stop 84 bearing against end portion 87 of flange 86.

Referring to FIGURES 4 and 12 of the drawings, it will be seen that bar 72 moving downwardly under the action of arm 79 will bear against end portion 71 of each lever arm 68 and cause each lever arm to pivot about the longitudinal axis of shaft 67. This downward movement of lever arm 68 will bring portion 69 into abutting relationship with tab 66 of plate 64 as shown in FIGURE 12. While portion 69 and tab 66 are in abutting relationship plate 64 is prevented from swinging upwardly towards side wall 13, in effect locking each stop means 63 to prevent a bottle 16 bearing against it from moving downwardly on associated shelf 17 into alignment with associated gate 20 should a bottle be withdrawn from that shelf of the unit.

On completion of one revolution of shaft 60, shoulder 88a of cam 88 acts against the arm 89 of switch 90 to shut off the motor driving the shaft. The apparatus is now in the at ready position and a single bottle may be withdrawn freely from the unit by an operator in the second or "vend" step now to be described.

In the second or vend step the operator may withdraw any single one of the bottles 16 visible in vertical slot 14 of front wall 11 of housing 10. The neck of each visible bottle projects forwardly through the space between adjacent closed gates 20 and may be easily grasped. As the selected bottle is pulled forwardly towards the operator, gate 20 immediately above the bottle will swing forwardly under pressure from the sloping neck of the bottle and pin 24 will enter adjacent slot 27 of locking bar 21. Since bolt 22 is clear of shoulder 39, bar 21 will slide upwardly as pin 24 enters slot 27 and moves in an upward arc. On entering slot 27, pin 24 will immediately bear against bevel 33 of associated block 29 and cause that block to slide upwardly along bar 21 to allow full entry of the pin into the slot. However, once block 29 has cleared slot 27 and pin 24 has moved into the slot there can be no further movement of any blocks with respect to bar 21 since the sum of the lengths of the blocks between flanges 30 and 34 together with the diameter of pin 24 will be equal to the distance between bearing surfaces 31 and 35 of the flanges. Consequently only one gate 20 may be opened during the vend step.

As the bottle is withdrawn by the operator, gate 20 will swing forwardly into a substantially horizontal position as shown in FIGURE 10 and the bottle may be completely withdrawn through the space between shafts 23 carrying the open gate and the gate immediately below it.

On upward movement of locking bar 21 under the action of gate 20, bearing surface 40 of shoulder 39 will move against head 54 of latch 53 and pivot the latch about pin 50. Latch 53 will be in the position shown in FIGURE 10 of the drawings, when bar 21 has reached its maximum upward limit of travel under the action of gate 20. Flange 44 will be released from notch 55 as latch 53 is moved upwardly and bolt 22 will move forward under the action of spring 57 to bear laterally against shoulder 39, this forward movement being of necessity slight in order that end portion 87 of flange 86 will not move off stop 84 and allow upward movement of bar 72 to release stop means 63.

On complete withdrawal of the bottle, gate 20 swings back downwardly to its original position of rest under the weight of locking bar 21 and by its own weight. When locking bar 21 returns to its original position of rest it carries shoulder 39 below the level of bolt 22. Since nothing other than shoulder 39 is restraining bolt 22 against the action of spring 57, the bolt moves forward over the shoulder and is halted when follower 61 meets cam 59. Head 54 of latch 53 follows the downward movement of surface 40 of shoulder 39 as bar 21 is lowered and latch 53 is brought to a position of rest in slot 45 in the same position as before the operation commenced, that is with the lower edge 53a of the latch between head 54 and notch 55 resting on the bottom end of slot 45.

When bolt 22 moves forward over shoulder 39, end portion 87 of flange 86 moves off stop 84 allowing spring 77 to move shift bar 72 upwardly. Upward movement of bar 72 shifts lever arms 68 to release plates 64 for free pivotal movement about shafts 65 and allows a bottle 16 to roll by gravity into the space left vacant by the bottle withdrawn from the unit.

It will be appreciated that with the completion of the second or vend step the apparatus returns to its original position of rest and is ready to repeat the operation on coin actuation and subsequent manipulation by the operator.

The apparatus of the invention is adaptable to vend different articles, for instance in the described embodiment each shelf can carry a different type of bottled liquid. Also, the shape and size of articles may be varied within limits; in the described embodiment the maximum transverse diameter of the bottle may vary between (1) an amount equal to the distance between the lower edge of a gate when at rest and the upper edge of the next lower gate, and (2) an amount equal to the distance between the upper gate when in its fully opened position and the next lower gate at rest.

Housing 10 may also serve as a refrigeration unit and may if desired contain both a cooling section and a pre-cooling section holding reserve bottles for replenishing shelves 17.

It will be seen from the embodiment described above that the invention provides a dispensing device in which withdrawal of the selected article from the unit is manipulated and controlled by the operator, thus avoiding the stress occasioned in conventional dispensing devices where a large force is applied to the moving parts to deliver an article into the hands of the operator.

What I claim is:
1. A bottle storage and dispensing apparatus comprising a housing having a front wall, a rear wall and two side walls, a vertically elongated slot in the front wall of the housing adjacent one side wall thereof, a plurality of shelves fixed in the housing and inclined downwardly to said one side wall whereby bottles laying on said shelves may roll to a position aligned with said slot, a plurality of gates pivotally mounted in said housing in a vertical plane and aligned with the vertical slot, one gate associated with each of said shelves and opening outwardly and upwardly therefrom towards the vertical slot, a pin projecting laterally from the lower free edge of each gate in the plane thereof, an elongated locking bar mounted vertically in the housing adjacent the vertical slot and the plurality of gates, said locking bar being slidable longitudinally and having a plurality of horizontal slots each positioned to receive the pin of an adjacent gate, means on said locking bar movable on acceptance of one pin in one slot to exclude entry of any other of said pins in the remaining slots, and means operable to release the locking bar for upward movement by the opening of said one gate and to lock said bar on closure of said one gate when said bar is returned to its original position of rest, said means comprising a horizontally slidable bolt overlapping a shoulder on said locking bar in the position of rest of the bar and retractable laterally away therefrom, a drive shaft, cam means mounted on the drive shaft and on the bolt adapted to move the bolt laterally on rotation of said shaft, spring means urging the bolt laterally in the direction of the shoulder of the locking bar, and a latch operable to engage the bolt when laterally retracted away from the shoulder, said latch being adapted to disengage the bolt when the locking bar is raised whereby the bolt moves laterally to bear against the shoulder of the locking bar in its raised position and moves further laterally over the shoulder of the locking bar when the bar is lowered to its original position of rest.

2. Apparatus as defined in claim 1 including motor means driving said shaft, the motor means being coinactuable.

3. Apparatus as defined in claim 2 wherein said bolt is moved to release and subsequently to lock said bar by one revolution of said shaft, a switch adapted to deactivate said motor means, and a cam on said drive shaft adapted to open said switch on one revolution of said shaft, said motor means being actuable independent of said switch.

4. Apparatus as defined in claim 1 including means to restrain a further article from moving into alignment with said one gate upon withdrawal of a single article therethrough and before said one gate is closed, said restraining means comprising: a longitudinally slidable shift bar mounted vertically in said housing parallel to said locking bar, stop means pivotally mounted in the housing in the path of the shelf and freely movable out of said path, means actuable by the shift bar to lock the stop means against movement out of said path, and means adapted to actuate the shift bar on actuation of said release and locking means whereby the stop means is locked when the locking bar is released and the stop means is released when the locking bar returns to its original position.

5. Apparatus as defined in claim 4 wherein the stop means comprises a plate freely swingable in the path of the shelf, a horizontal shaft mounted rotatably in the housing and carrying said plate, a lever arm projecting laterally from said shaft and engaging said shift bar, said lever arm being configured to bear against said plate when shifted by longitudinal movement of said shift bar whereby said plate is restrained from movement in the downward direction of bottles on the shelf associated with said one gate.

6. Apparatus as defined in claim 1 including a shoulder mounted on the locking bar in the lower portion thereof, and including means to restrain a further article from moving into alignment with said one gate upon withdrawal of a single article therethrough and before said one gate is closed; the means operable to release and to lock the bar comprising a horizontally slidable bolt overlapping said shoulder in the position of rest of the bar and retractable laterally away therefrom, a drive shaft, first cam means mounted on the drive shaft and on the bolt adapted to move the bolt laterally on rotation of said shaft, first spring means urging the bolt laterally in the direction of the shoulder, and a latch operable to engage the bolt when laterally retracted away from the shoulder, said latch being adapted to disengage the bolt when the bar is raised whereby the bolt moves laterally to bear against the shoulder of the bar in its raised position and moves further laterally over the shoulder when the bar is lowered to its original position of rest; said restraining means comprising a longitudinally slidable shift bar mounted vertically in said housing parallel to said locking bar, stop means pivotally mounted in the housing in the path of each shelf and freely movable out of said path, means actuable by the shift bar on downward movement to releasably lock the stop means against movement out of said path, second spring means urging the shift bar upwardly, and second cam means mounted on said drive shaft adapted to move the shift bar downwardly on rotation of said shaft laterally retracting said bolt and to release the shift bar for upward movement by said second spring means on return of the locking bar to its original position of rest.

7. Apparatus as defined in claim 6 including coin-actuable motor means driving said shaft, said bolt being moved to release and subsequently to lock said bar by one revolution of said shaft, a switch adapted to de-activate said motor means, and third cam means on said drive shaft adapted to open said switch on one revolution of said shaft, said motor means being actuable independent of said switch.

8. A bottle storage and dispensing apparatus comprising a housing, a plurality of shelves fixed within the housing and inclined downwardly towards one wall thereof, a plurality of gates accessible from without the housing, one gate being associated with each of said shelves adjacent its lower end, each gate being pivotally attached to said housing and adapted to swing freely from a closed position of rest to an open position, a locking bar mounted on said housing in alignment with said gates and slidable longitudinally in an axis parallel to the plane of rest of said gates, a pin carried by each of said gates parallel to but spaced from the pivotal axis thereof, a plurality of slots in the locking bar one juxtapositioned with respect to each of said gates normal to the plane of rest thereof and adapted to receive the pin of an adjacent gate on pivotal movement of said adjacent gate from its position of rest whereby the bar slides on such movement, means whereby one only of said gates is openable to actuate the said locking bar, said means comprising a plurality of blocks mounted on said locking bar and slidable longitudinally thereon beside said slots, each block being of a length equal to the distance between the centre lines of two adjacent slots and being adapted at a position of rest to have its lower edge in the horizontal plane of the lower edge of the slot, the lower corner of each block adjacent a corresponding gate being bevelled to allow the pin of said corresponding gate to enter the slot, terminal shoulders mounted on said locking bar to restrict movement of said blocks longitudinally of said bar a length equal to the width of one of said slots, means operable to release the locking bar for such slidable movement and to lock the bar on its return to its original position when said adjacent gate is closed, means to restrain a further bottle from moving into alignment with said gate upon withdrawal of a single bottle from the shelf through the gate and before the gate returns to its original position of rest, said restraining means comprising; a shift bar slidably mounted in said housing parallel to said locking bar, stop means pivotally mounted in the housing in the path of the shelf and freely movable out of said path, means actuable by said shift bar to lock the stop means against movement out of said path, and means adapted to actuate the shift bar on actuation of said release and locking means whereby the stop means is locked when the locking bar is released and is released when the locking bar returns to its original position.

9. A device as defined in claim 8 wherein the locking bar carries a shoulder, the means operable to release and to lock the bar comprising: a bolt overlapping the shoulder of the locking bar in its position of rest and retractable laterally away therefrom, cam means rotatable to move the bolt laterally, means urging the bolt towards the shoulder, and a latch operable to engage the bolt when retracted, said latch being disengaged by the locking bar when said bar is raised whereby the bolt moves laterally against and subsequently over said shoulder to lock the bar on returning to its position of rest.

10. A device as defined in claim 9 in which the said cam is rotated by coin-actuable motor means.

References Cited by the Examiner

UNITED STATES PATENTS

| | | | |
|---|---|---|---|
| 3,115,274 | 12/1963 | Burton et al. | 221—125 |
| 3,169,621 | 2/1965 | Johnson et al. | 221—125 |
| 3,187,941 | 6/1965 | Burton et al. | 221—125 |

FOREIGN PATENTS

| | | |
|---|---|---|
| 230,454 | 9/1960 | Australia. |
| 931,724 | 7/1963 | Great Britain. |

ROBERT B. REEVES, *Primary Examiner.*

WALTER SOBIN, *Examiner.*